M. J. McCARTHY.
SEPARATOR COOP FOR POULTRY.
APPLICATION FILED MAY 7, 1917.
1,272,823.
Patented July 16, 1918.
2 SHEETS—SHEET 1.
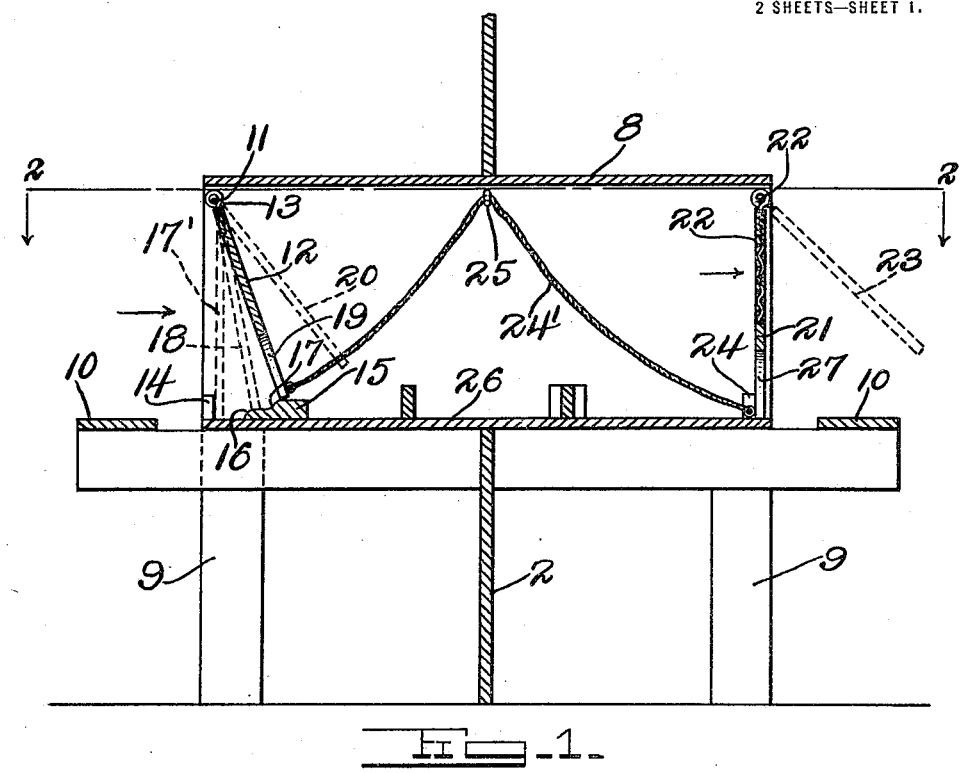
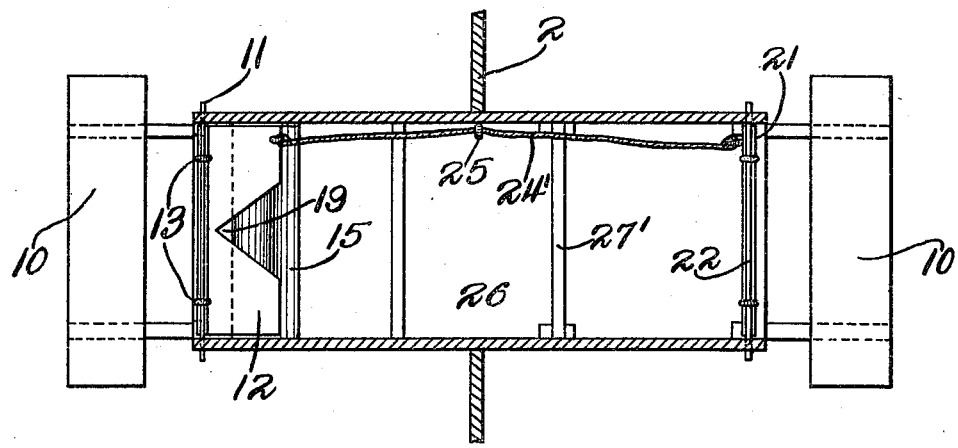
INVENTOR
Michael J. McCarthy
WITNESSES
John P. Woodworth
B. J. Harvey Jr.
BY Richard Bowen
ATTORNEY

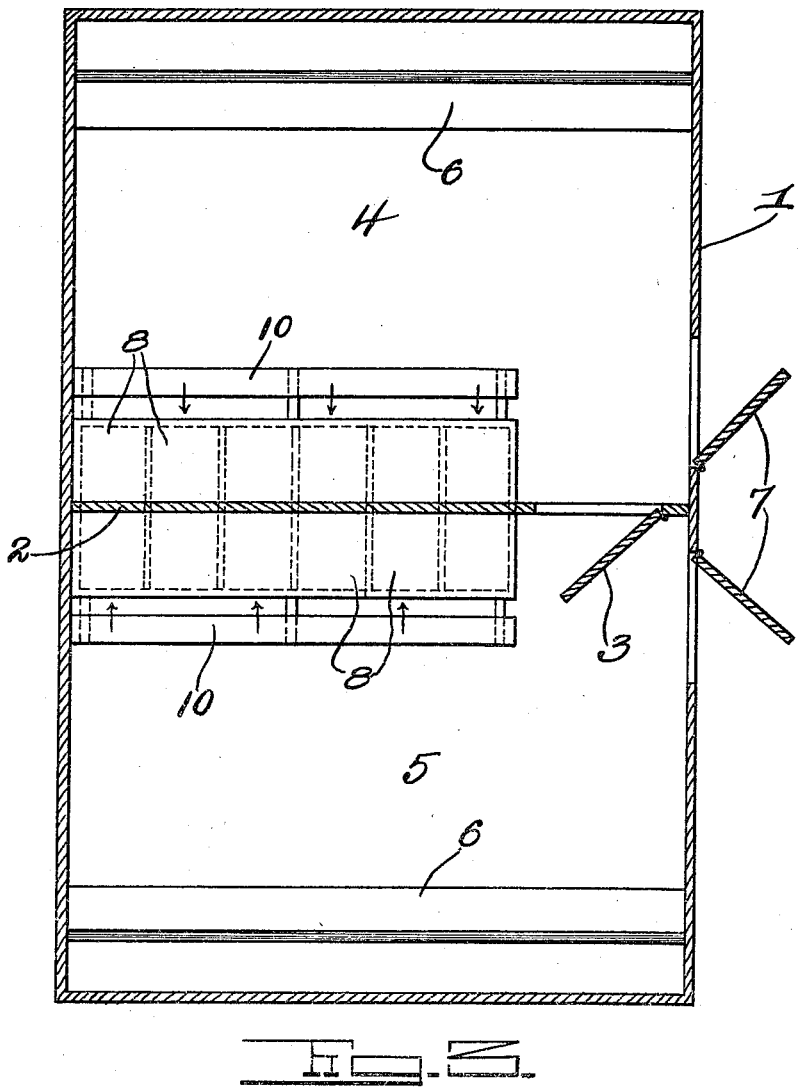

UNITED STATES PATENT OFFICE.

MICHAEL J. McCARTHY, OF FLORENCE, MASSACHUSETTS.

SEPARATOR-COOP FOR POULTRY.

1,272,823.  Specification of Letters Patent.  Patented July 16, 1918.

Application filed May 7, 1917. Serial No. 166,976.

*To all whom it may concern:*

Be it known that I, MICHAEL J. MCCARTHY, a citizen of the United States, residing at Florence, in the county of Hampshire and State of Massachusetts, have invented certain new and useful Improvements in Separator-Coops for Poultry, of which the following is a specification.

This invention relates to separator coops for poultry, the object of which is to segregate productive from non-productive poultry.

Another object of the invention is to systematically arrange the trap nests in the coop so that the productive hens may enter the nest from one side of the coop and pass out through the other side of the nest into the opposite side or compartment of the coop, notation of these hens can then be made, but if desired they can be retained in this opposite side of the coop and enter nests having their inlet openings on this side and after having laid must pass into the first side of the coop.

A further object of this invention is to provide trapping nests which after having been once set will be automatically reset by the passage of the hens therethrough.

A still further object of the invention is to provide a device of this character which may be set for any size hens and will successively operate to reset at the same position, by the mere passage of the hen from the nest.

The above and other objects and advantages of this invention will be in part described, and in part understood from the following description of the present preferred embodiment, the same being illustrated in the accompanying drawings, in which:

Figure 1 is a longitudinal sectional view of trap constructed in accordance with my invention, and showing the position of the same in a coop, only a fragmentary portion of the latter being shown.

Fig. 2 is a horizontal sectional view taken on the line 2—2 of Fig. 1, and looking in the direction of the arrows, and Fig. 3 is a horizontal sectional view of a coop equipped with trap nests, the latter being shown in top plan.

In the drawings, a coop 1 is shown, which may be made of any suitable material and may be of any desired configuration, although in this instance a rectangular form is shown. A partition 2 is formed in the coop approximately midway the ends of the latter, access being gained through the partition by a door 3. By equipping the coop 1 with the partition 2 pens 4 and 5 are formed, each of which has a roost 6 mounted therein which may be of the usual or any desired form. Access is gained to the pens 4 and 5, from the outside of the coop 1, through doors 7.

A plurality of trap nests, generally designated 8, are contiguously arranged in the partition 2 of the coop and are alternately arranged so that one nest will have its inlet opening in the pen 4 and its outlet opening in the pen 5, while the next adjacent nest will have its outlet end communicating with pen 4 and its inlet end communicating with pen 5. The trap nests arranged in this manner constitutes two series, one of which communicates with one pen at its inlet end, the other series communicating at its inlet with the other pen. In practice, the nests of but one series will be used at a time, the nests of the other series being secured closed in any suitable manner. By this arrangement, the fowls may pass through the nests from one compartment of the coop into the other compartment and the fowls which have laid are noted at the end of the day, after which the other series of nests may be released for operation, these first series being secured closed so that the following day the fowls may pass back through the second series into the first compartment of the coop. This renders it possible to check up on the second day the fowls which are left in the second compartment, and this operation may be alternated thus permitting track to be kept of the productive fowls with but little trouble.

The trap nests 8 are of an identical configuration and it will therefore be necessary to specifically describe only one of these in order to comprehend the invention. As shown in Figs. 1 and 2 of the drawings, each nest is preferably of an oblong configuration and is appreciably elevated from the floor of the coop 1, said floor being provided with vertical supporting standards 9 which engage the opposite ends of the nest in order to support the latter, and also coöperating in the support of runways 10 which are arranged in close proximity to the inlet and outlet ends of said nests. The inlet end of each nest is equipped with a transversely extending rod 11 which is arranged in close proximity to the top of the nest and upon which a door 12 is swung. Eye bolts 13 are carried by the upper marginal edge of said door 12 and loosely engage the rod 11. Outward movement of the door 12 is limited in view of stops 14 which are mounted on the trap, as shown to advantage in Fig. 1. An abutment block 15 is mounted on the floor of the trap 8 and remote from the inlet opening of the latter. This abutment is preferably formed from a solid bar having the margin thereof, which is adjacent the inlet opening of the trap, beveled, as indicated at 16, the bar being enlarged from a point approximately midway the lateral margins thereof, so as to provide a beveled shoulder 17. When the door 12 is in a closed position it will abut the stops 14. This position is indicated by dotted lines 17' in Fig. 1. If desired the door 12 may be set to permit the entrance of small poultry, as indicated by the dotted lines 18 in Fig. 1, and may be set to accommodate the entrance of large poultry as indicated by the full lines in Fig. 1. The lower marginal edge of the door 12 has an inverted V-shape portion removed therefrom, as indicated at 19 to facilitate entrance of the poultry. As the poultry enters through the openings 19 in the door 12, the latter will be swung upwardly substantially into a position as indicated by the dotted lines 20 in Fig. 1. As soon as the poultry has passed completely from beneath the door 12, the latter will by force of gravity wipe over the abutment 15 and back into its closed position, as indicated by the dotted lines 17' in Fig. 1, thereby preventing the entrance of other poultry. It is, of course, understood that the door 12 will be constructed of some very light material so that entrance of the poultry into the trap will not be materally retarded.

The exit door of the trap is indicated at 21 in the drawings and comprises a solid frame having a wire mesh insert 22 through which the light ray may pass into the trap. In this way when the fowl gets into the trap it can immediately sight the proper passageway through which it is to leave the trap. The door or closure 21 is loosely mounted on a rod 22 in the same manner as the door 12 is pivoted on the rod 11. The door 21 is, of course, adapted to swing outwardly, when the body of the fowl comes into contact therewith, into a position substantially as indicated by the dotted lines 23 in Fig. 1. Inward movement of the door in the trap is limited by stops 24.

A cable 24' is trained through an eye 25, which is carried by one side of the trap, adjacent the top of the latter, one end of the cable being in engagement with the bottom of the closure 12, and the opposite end being in engagement with the lower end of the closure 21. It will be noted that the cable 24' is normally slack, and its length must be accurately determined in order to insure successful operation of the trap and successful automatic resetting of the same.

The trap is set for the entrance of poultry, as shown in Fig. 1 of the drawings. This as shown, and as stated above, is set for large poultry, which upon entrance into the trap will swing the closure 12 inwardly in a manner already specified. The door will gravitate into a closed position, as soon as the fowl has passed therebeneath. A nest 26 is formed preferably midway the ends of the trap and on the floor of the latter. The fowl upon leaving the nest will proceed through the opening 27 in the lower margin of the closure 21, this opening, of course, being too small to permit the fowl to pass therethrough, consequently causing the closure 21 to be pushed outwardly into the position, as indicated by the dotted lines 23, and in this way causing pressure to be exerted on the cable 24', but only to the extent that the closure 12 is restored to its original position, that is, on top of the abutment 15, as shown in Fig. 1. It is for this reason that the measurement of the cable 24' must be very precise in order to insure accurate resetting of the trap. The closure 21 will, of course, gravitate into a closed position. It will also be noted that one side of the nest 26, as indicated at 27', is removable in order to permit cleaning of the nest.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

I claim:

1. In trap nests, a casing having an inlet and an outlet opening, closure members loosely secured at their upper edges to the top of said casing and acting to close said openings, the closure member for the inlet opening being movable inwardly of the casing and the closure member of the outlet opening being movable outwardly of the casing, an abutment member carried by said casing for engagement by the lower edge of said inlet closure member so as to hold said member in adjustment about its axis of movement to permit entry of fowl into the casing, and flexible connections between the said closure members adapted to permit movement of the inlet closure member into a substantially vertical position by gravity when raised and released by a fowl entering the casing, said connections being also adapted to return the inlet closure member to set position when the outlet closure member is raised by a fowl escaping from the casing.

2. In a trap nest, a casing provided with an inlet and an outlet opening, closure members for said openings loosely secured at their upper edges to the top of the casing, the inlet closure member being movable inwardly of the casing and the outlet closure member being movable outwardly of the casing, an abutment member mounted within the casing and extending transversely thereof, said member being positioned adjacent the inlet opening of the casing and having its inner portion thickened, the bar being engageable by the lower edge of the inlet closure member so as to hold the said member in any one of several adjusted positions about its axis of movement, and connections between said closure members for permitting the inlet member to be moved into substantially vertical position by gravity, when raised and released by a fowl entering the casing, said connections being adapted to return the said inlet members to its initial position when the outlet member is raised by a fowl escaping from the casing.

In testimony whereof I affix my signature in presence of two witnesses.

MICHAEL J. McCARTHY.

Witnesses:
JOHN J. VAUGHN,
MICHAEL TOBIN.